(12) United States Patent
Trapp

(10) Patent No.: US 7,809,958 B2
(45) Date of Patent: Oct. 5, 2010

(54) METHOD FOR GUARANTEEING FRESHNESS OF RESULTS FOR QUERIES AGAINST A NON-SECURE DATA STORE

(75) Inventor: Martin Trapp, Baden-Baden (DE)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 11/877,009

(22) Filed: Oct. 23, 2007

(65) Prior Publication Data

US 2008/0040620 A1  Feb. 14, 2008

Related U.S. Application Data

(63) Continuation of application No. 10/394,776, filed on Mar. 21, 2003, now Pat. No. 7,325,130.

(51) Int. Cl.
*G06F 12/14* (2006.01)
*G06F 11/30* (2006.01)

(52) U.S. Cl. .................................. 713/193; 713/165

(58) Field of Classification Search ................. 713/193, 713/165
See application file for complete search history.

(56) References Cited

U.S. PATENT DOCUMENTS

| | | | |
|---|---|---|---|
| 5,671,285 A | 9/1997 | Newman | |
| 6,584,507 B1 * | 6/2003 | Bradley et al. | 709/229 |
| 6,772,337 B1 * | 8/2004 | Yener | 713/165 |
| 7,254,701 B2 | 8/2007 | Lu | |
| 2002/0161742 A1 | 10/2002 | Heiden | |

FOREIGN PATENT DOCUMENTS

| | | |
|---|---|---|
| TW | 523695 B | 3/2003 |
| WO | WO 01/33317 A1 | 5/2001 |

* cited by examiner

*Primary Examiner*—Kambiz Zand
*Assistant Examiner*—Aubrey H Wyszynski
(74) *Attorney, Agent, or Firm*—Michael J. Buchenhorner; Vazken Alexanion

(57) ABSTRACT

A method for guaranteeing freshness of results for queries against a non-secure data store extends a read operation to include steps of: receiving a read instruction for application data to be read; determining a location within the data store for the application data to be read; validating a message authentication code contained at the location; parsing data contained at the location into the application data and control information, the control information including: a timestamp, a link to a check entry, and a message authentication code; authenticating the control information for each check item associated with the primary item along a path from the primary item to a root each time a primary item is read from the data store by following links; and transmitting the application data to a calling application.

15 Claims, 10 Drawing Sheets

$$\langle c_1, s_1 \rangle = \langle c_x, s_x \rangle$$

$$\langle c_2, s_2 \rangle = \langle c_{c_1}, s_{c_1} \rangle$$

$$\langle c_3, s_3 \rangle = \langle c_{c_2}, s_{c_2} \rangle$$

...

$$\langle c_i, s_i \rangle = \langle c_{c_{i-1}}, s_{c_{i-1}} \rangle$$

where
N is the maximal number of primary items, and
n is the number of check entries per check item $$c_0 = x, \quad a_0 = 0, \quad l_0 = N,$$
$$\text{and for } i > 0:$$
$$c_i = \frac{c_{i-1} - a_{i-1}}{n} + a_i$$
$$s_i = (c_{i-1} - a_{i-1}) \bmod n$$
$$l_i = \left\lceil \frac{l_{i-1}}{n} \right\rceil$$
$$a_i = a_{i-1} + l_{i-1}$$

*FIG. 9*

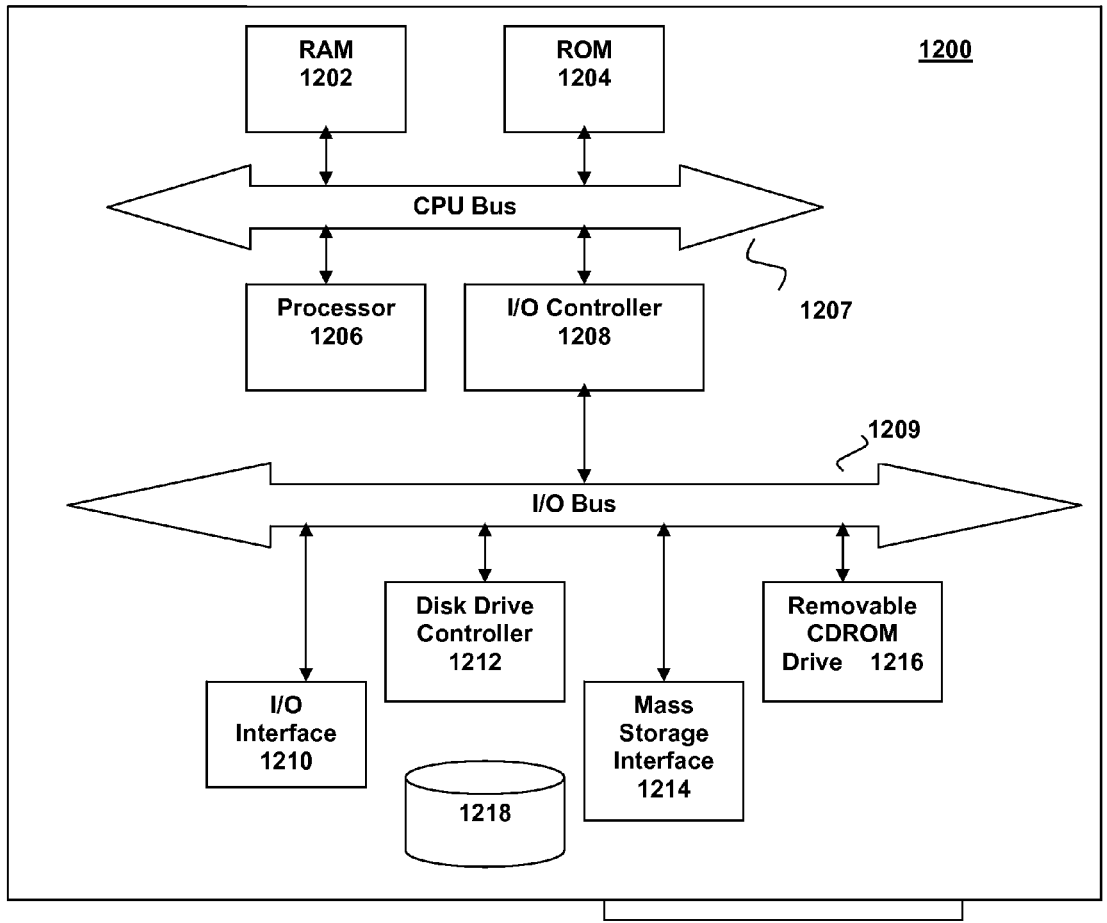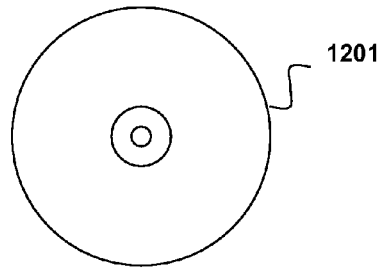
FIG. 12

METHOD FOR GUARANTEEING FRESHNESS OF RESULTS FOR QUERIES AGAINST A NON-SECURE DATA STORE

CROSS-REFERENCE TO RELATED APPLICATIONS

This application is a continuation of U.S. patent application Ser. No. 10/394,776, filed on Mar. 21, 2003, which is incorporated by reference herein.

STATEMENT REGARDING FEDERALLY-SPONSORED RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of data security, and more particularly relates to the reliable retrieval of data from a non-trusted data store.

BACKGROUND OF THE INVENTION

Information Technology (IT) systems depend on reliable data stores and these data stores are often situated outside of the secure computational environment of the IT system and consequently are vulnerable to attack. Secure computational environments can be used to protect their internal applications from physical and logical attacks, but these applications may still depend on external data stores, which cannot be deployed inside the secure computational environment. See Trapp, et al., "Method and Apparatus for Secure Processing of Sensitive Data," application Ser. No. 10/065,802, hereby incorporated herein by reference.

Standard cryptographic techniques can be used to encrypt and authenticate the contents of the data store, and can thus protect the data against spying and unauthorized modifications, but they are not sufficient to guarantee that queries to a data store always return the most accurate and up-to-date data. A replay attack to a query against a data store is an attack in which an attacker answers the query with data that was once stored in the data store, but is no longer current. An attacker who gains entry into the data store can respond to queries made by an application program with outdated data, dissimulating that these are the actual contents of the data store. Such an attack is often called a replay attack, because the attacker "replays" data that was formerly valid in the system. This is a critical problem in many applications today which rely on information from data stores. The severity of this problem becomes apparent if one considers an application querying the amount in a bank account or entries in a watch list of criminals.

Although there are known countermeasures to replay attacks for secure communication channels over computer networks, these techniques cannot be adapted to guard against replay attacks for database queries against a data store situated outside the secure computational environment (i.e., a non-secure data store). Most large systems today execute outside of a secure computational environment, therefore there is a need for a method which overcomes the shortcomings of the prior art.

SUMMARY OF THE INVENTION

According to the invention, a method allows an application that executes inside a secure computational environment to detect and prevent replay attacks during queries to a non-secure data store, e.g. a database or a file system. Briefly, a method according to the invention extends a read operation for reading application data from a non-secure data store to include the steps of: receiving a read instruction for application data; determining a location within the non-secure data store for the application data; validating a message authentication code contained at the location; parsing data from the location into application data and control information; authenticating the control information; and transmitting the application data to a calling application.

According to an embodiment of the invention, a system for the detection and prevention of replay attacks comprises logic configured to perform the above methods.

According to another embodiment, a computer program product includes instructions for performing the above methods.

BRIEF DESCRIPTION OF THE DRAWINGS

FIG. 9 shows the equations for computing links to check entries on demand.

FIG. 12 shows a simplified block diagram of a computer program product on which an embodiment of the invention can be advantageously used.

DETAILED DESCRIPTION OF THE PREFERRED EMBODIMENTS

Figure 1:
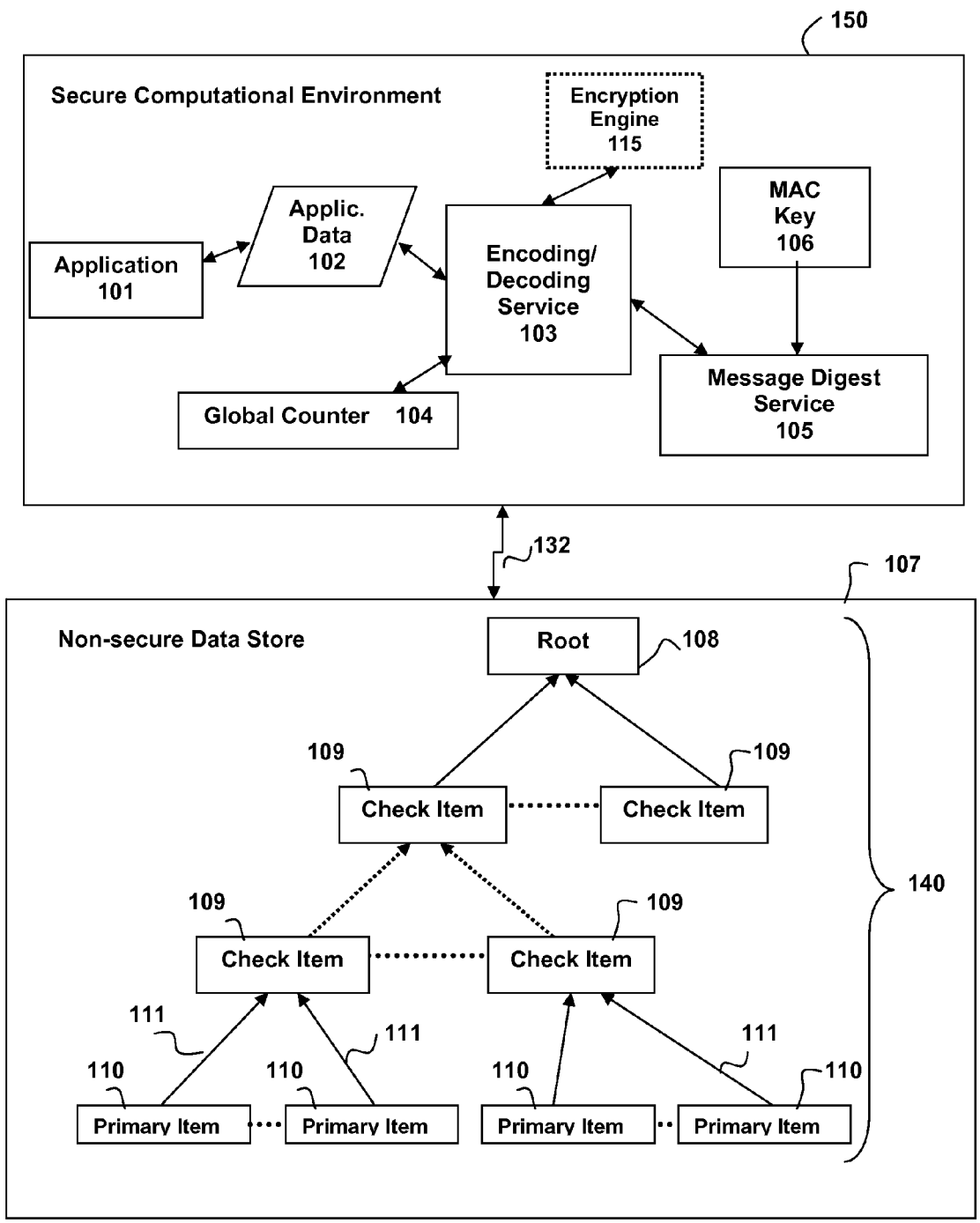
FIG. 1 illustrates the high-level structure of the secure computational environment and the data store.

We discuss a method to recognize and prevent replay attacks during queries against an external (non-secure) data store made by an application running in a secure computational environment.

A secure computational environment ("secure environment") is one wherein transactions cannot be viewed or accessed from outside of the secure environment. Further, it is impossible to maliciously change the processing or the processed data from outside of the secure environment. Attempts to tamper with a secure environment, the programs running inside, or the data being processed inside are detected by the environment, which then destroys sensitive data stored inside the environment or makes it permanently inaccessible. An example of a secure environment is a general-purpose computing device such as the IBM 4758 cryptographic coprocessor, which has a FIPS (Federal Information Processing Standards) 140-1 Level 4 validation. See Schneck, et al., "System for Controlling Access and Distribution of Digital Property", U.S. Pat. No. 6,314,409, issued Nov. 6, 2001, hereby incorporated herein by reference.

In a preferred embodiment of the invention, the data store, which can be a database or a file system, is viewed as a set of items. An item is a part of the data store that is always read and written in one piece. An item can, for example, denote a single field or an entire row in a database table, a record in a file, or a whole file. There are two kinds of items: primary items and check items. Application data is stored in primary items. Check items contain the control, or security, information. Primary and check items contain a message authentication code, a link to a check entry and a virtual time (VTime) field. Each check item holds at least two check entries. The check entries represent single VTime values stored as an array within the check item.

An important feature of the invention is the use of a global counter, timestamps and a hierarchy of check entries to determine, inside a secure environment, whether a query to an external data store returns the most up-to-date data (the freshest data). Virtual time is the value of a global counter which is logically located within the secure environment. The global counter is incremented each time a primary item is written into the data store. For details see FIG. 5. The counter can be implemented in hardware or software, but its value must not be lost when the secure environment is reset or rebooted. Preferably the value of the global counter is stored in battery-backed RAM inside the secure environment.

Another aspect of the invention is that items (primary and check items) are augmented (i.e., appended) with a VTime value (timestamp), a unique link to a check entry, and a message authentication code (MAC). All sensitive operations are confined within the secure environment. For example, the MAC is generated and checked inside the secure environment using a unique MAC key, which is kept inside the secure environment where it cannot be altered from the outside.

Items and their links form a tree-like hierarchical structure, where the leaves of this tree are primary items, and all other nodes, including the root, are check items. The method embodies processing which extends both the read and write operations to/from a non-secure data store. Replay attacks are detected during read operations. Countermeasures to detect and prevent future replay attacks are implemented during write operations and are described below.

Referring to FIG. 1 there is shown a high level diagram of a system 100 for protection against replay attacks. Inside a secure environment 150, an application 101 executes a command to store application data 102 into a data store 107, which is outside the secure environment 150. The arrow 132 represents a communicative association between the secure environment 150 and the data store 107. Since the data store 107 is outside of the secure environment 150, it is considered to be a non-secure system. We define a "non-secure" system as one which can be illegally accessed (i.e., unauthorized access). It therefore follows that a "trusted" system is one which cannot be illegally accessed.

According to an embodiment of the invention, an application 101 executes within (is logically located in) a secure environment 150. The Global Counter (the timer) 104, the Encoding/Decoding Service 103, the Message Digest Service 105 and the Encryption Engine 115 are also logically located (i.e., not necessarily physically located) within the secure environment 150. According to the embodiment described herein, a write operation would proceed as follows: the application 101 transmits the application data 102 to the Encoding/Decoding Service 103. The Encoding/Decoding Service 103 increments a Global Counter 104 and augments the application data 102 with the actual value of the Global Counter 104 and creates a link 111 from a primary item 110 to an entry in a check item 109.

Several schemes are possible for the creation of the links from items to their check entries: the Encoding/Decoding Service 103 can a) allocate and assign a new check entry whenever it writes an item; or b) allocate and assign the check entry for an item during the first write operation to that item. Consecutive writes to the same item will then reuse the link stored in that item. A variation of b is a scheme c) where the system generates items, check entries, and the links between them during an initialization phase or periodically on demand. In this case, whenever the Encoding/Decoding Service 103 wants to update an item, it reuses these predefined links, which are stored in the initialized items. In the following discussion we will assume, for the sake of simplicity, that scheme c is used. Further details for the allocation of check entries and an alternative representation of links are given in FIG. 9.

Details of the structure of items and the check tree 140 will be given in FIG. 3. The Encoding/Decoding Service 103 uses the Message Digest Service 105 to compute a MAC (Message Authentication Code) for the augmented data (which includes the link and timestamp) using the MAC key 106. Optionally, the data being written into the primary and check items can be encrypted and decrypted using the Encryption Engine 115. The augmented and protected data is then written into a primary item 110 inside the data store 107. Then the Encoding/Decoding Service 103 updates the associated check items 109 by updating the timestamps in the check entries and the MACs for the check items 109. Inside the check item 109, two timestamps are updated: one is the check entry, which is referenced by another check item, and the other is the timestamp of the check item itself. The timestamps are updated with the time entry created when the Encoding/Decoding Service 103 incremented the Global Counter 104.

FIG. 1 shows a subset of a check tree 140 as an example: dashed arrows and dots represent arbitrary layers of check items 109. The VTime that is stored as the timestamp of a primary item 110 or check item 109 is the point in time (as indicated by the value of the Global Counter 104) when the item was last written to the data store 107. This VTime is also recorded in the item's check entry. Therefore, whenever a primary item 110 is written to the data store 107, all check items 109 on the check tree path between the primary item 110 and the root 108 of the check tree 140 are also updated with the new timestamp.

The Encoding/Decoding Service 103 updates the check items 109, starting with the check entry that was referenced by the link in the just-written primary item 110, and then traverses up the tree structure 140 until it has updated the root 108 of the tree 140, thus updating all of the control information within items along that path.

In one embodiment of the invention, it is possible to avoid the explicit storage of links to check entries. The addresses of the check entries are computed on demand from the address of the item in which the link would otherwise be explicitly stored, thus eliminating the need for explicitly storing the links. The required equations for this embodiment are shown in FIG. 9.

A read operation begins when the application 101, inside the secure environment 150, delegates a request for application data 102 to the Encoding/Decoding Service 103. The Encoding/Decoding Service 103 reads the requested primary item 110 and all check items 109 that are on the path from the requested primary item 110, up to and including the root 108 of the check tree 140. For all items that are read, the Encoding/Decoding Service 103 uses the Message Digest Service 105, with the MAC key 106, to verify that all MACs in the read items are correct. For these tests, the Encoding/Decoding Service 103 recomputes a MAC for the data (including link and timestamp) stored in the item, and compares it to the MAC that is currently stored in the item. If the data is authentic, i.e. it was generated by the Encoding/Decoding Service 103, both values (the MAC that is currently stored in the item and the recomputed MAC value) are the same. If the MAC comparison is successful, the Encoding/Decoding Service 103 then determines if the timestamp value of the root 108 of the check tree 140 is equal to the actual value of the Global Counter 104. If the MAC comparison is not successful, the read operation terminates and an error is reported to the caller.

When a primary item 110 is read from a data store 107, the item's timestamp must still match the value in its check entry. The timestamp of the check item, which holds this check entry, must match its own check entry and so on, up to the root 108 of the check tree 140. The timestamp of the check tree's root 108 must always be equal to the actual virtual time inside the secure environment 150 (as indicated by the Global Counter 104). If one of these conditions fails, or if any MAC of these items is wrong, the data is assumed to have been tampered with or replayed, and the method reports an error.

Additionally, the Encoding/Decoding Service 103 determines, for all other items read, whether their timestamp values are identical to the values stored in the check entries referenced by the item's link 111. The Encoding/Decoding Service 103 performs a check to determine whether each item on the path from the primary item 110 to the root 108 is fresh. Immediately after a primary item 110 and its check items 109 are written, the timestamps of all these items are set to the actual virtual time (the value of the Global Counter 104). When a primary item 110 and its check items 109 are read, they do not necessarily all have the same timestamps, but for each item, the timestamp must be the same as the timestamp recorded in the item's check entry. The items on the same path from primary item 110 to the root 108 of the check tree 140 only have the same timestamps if no writes to different primary items (and their check items) occurred between the write and the read of a primary item (and its check items). If one write operation to a different primary item b comes after a write to primary item a and before a read of primary item a, then: all of the items on the path from b to the root 108 have the same timestamps; and it follows that now not all of the items on the path from a to the root 108 have the same timestamps anymore (at least the root 108 has changed in the meanwhile, but maybe also the timestamps of additional items, if the path from a to the root, and the path from b to the root 108 have more items in common). What holds in both cases is that the timestamp of each item is identical to the timestamp in its check entry, which is located inside its check item 109.

If all MACs are found to be correct, and all timestamp comparisons match, the Encoding/Decoding Service 103, using, for example, a parsing algorithm, strips off the timestamp, link, and MAC from the contents of the primary item 110, and returns the remaining data as application data 102 to the application 101. If a MAC is incorrect, or a timestamp comparison fails, the Encoding/Decoding Service 103 returns an error code to the calling application 101, indicating that the data in the data store 107 was tampered with and consequently may contain out-of-date contents, perhaps as the result of a replay attack.

Figure 2:
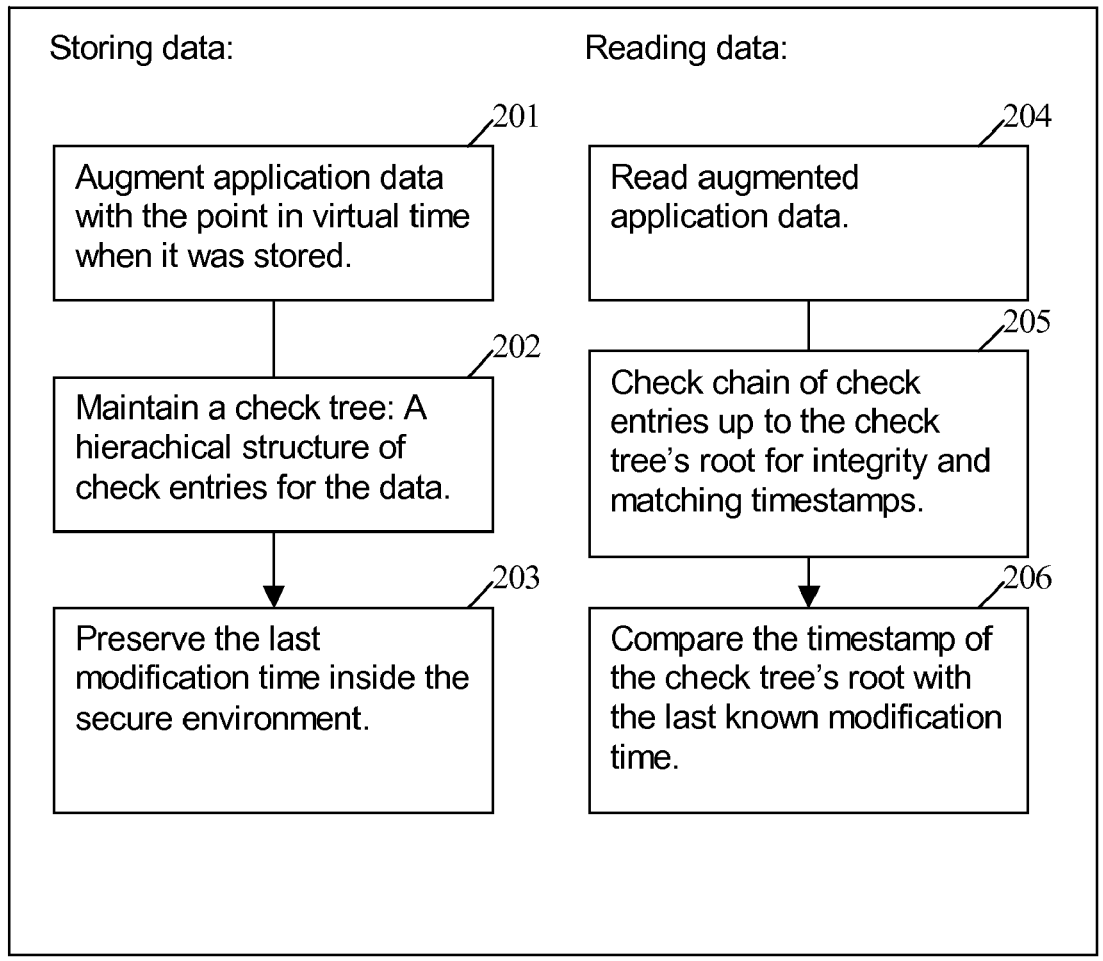
FIG. 2 illustrates an abstract view of the protection against replay attacks.

FIG. 2 shows the abstract steps for protection against replay attacks. The method extends the read/write operations to and from the data store 107. Replay attacks are detected during reads from the data store 107

The extended write operation comprises steps 201, 202, and 203. In step 201 the application data 102 is augmented with control information, such as the VTime when the item was stored in, or written to, the data store 107. This VTime is the value of the Global Counter 104. In step 202 a tree-like, hierarchical data structure, called the check tree, is maintained, which consists of check entries which are stored in check items. A check entry records the last modification time of the item that links to it. The tree-like structure is maintained with the use of links from primary item 110 to check items 109 along a path to the root 108. In step 203, the value of the Global Counter 104, which shows the last modification time of the root 108 of the check tree 140, is preserved inside the secure environment 150. In other words, the value of the Global Counter 104 remains the same until the next time that data is written to the data store.

The extended read operation comprises the steps 204, 205, and 206. In step 204, a primary item 110 is read from the data store 107. The modification time of that item (recorded in the item itself) is then compared to the modification time recorded in the item's check entry in step 205. This check is repeated for all parent nodes in the check tree 140 up to the root 108. In step 206 the last modification time of the root 108 is compared to the value of the Global Counter 104 inside the secure environment 150, which reflects the last point in time when the root was modified. A replay attack will be detected if any of these checks fail, or if the MACs of the items are not valid.

FIG. 2 gives a very abstract view. Details about the structure of data items, the structure of the check tree 140, protection of items with MACs, data definitions, algorithms and variations of the method are given below.

Figure 3:
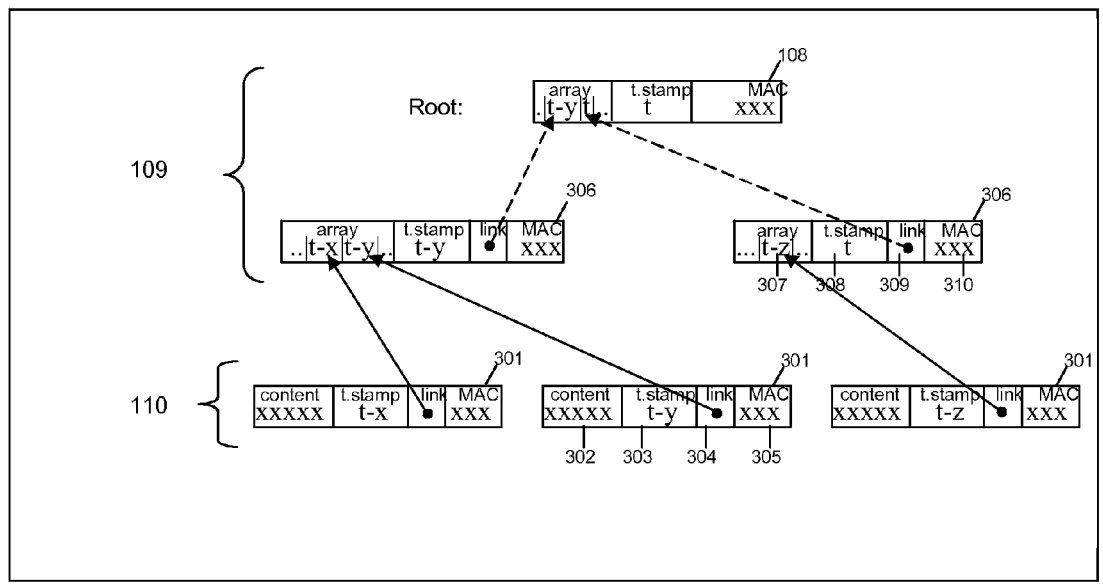
FIG. 3 illustrates the detailed structure of items and the check tree.

FIG. 3 shows the detailed structure of primary items 110 and check items 109 in the check tree 140. It shows a subset 300 of check tree 140 as an example: dashed arrows stand for arbitrary layers of check items 109. Primary items 110 consist of two parts: the content, 302, which holds application data, and the control information which contains: a timestamp 303, a link 304 which holds the address of a check entry, and a MAC 305. Check items 109 contain an array 307 of at least two check entries, and, as in primary items, a timestamp 308, a link 309 to a check entry, and a MAC 310. Timestamps 308 denote the point in virtual time (which value is provided by the Global Counter 104) when the item was last written. The MAC 310 protects the content of the items against unrecognized modification.

The root 108 of the check tree 140 is special. It is a check item 109 which does not have a link to a check entry. All other items 109 and 110 have links that point to check entries. Links are pairs <c, s>, where c denotes a check item (109), and s denotes an index into c's array of check entries (307). A link $<c_x, s_x>$ points from an item x to x's check entry, which is located in check item $c_x$. Each item has a unique link, i.e. no two items are linked to the same check entry. The leaves of the check tree 140 are always primary items 110. The root 108 and the inner nodes of the check tree 140 are all check items 109.

Check items 109 have to be created and linked whenever a new primary item 110 is allocated in (i.e., written to) the Data Store 107. If the number of primary items 110 is fixed, all items and links 111 can be created beforehand. It is also possible to proportionally increase the number of primary items 110 and thereby create the necessary check items 109 and links 111 accordingly.

The size of the check entry array 307 in check items 109 is arbitrary, the only requirement is that it contains at least two entries. This guarantees that the size of a check tree 140 for a finite set of primary items 110 will also be finite. Different check items 109 may have check entry arrays of different sizes. The larger the check entry arrays are, the shorter will be the height of the resulting check tree, producing a flatter hierarchical structure. This results in less check entries on a path in the check tree, but also in larger check items 109 that have to be updated and checked during read/write operations.

In another implementation of the system to prevent replay attacks some or all of the data that is stored in the primary items 110 and/or the check items 109 are encrypted, using the Encryption Engine 115. While this is a desirable feature, it is not necessary for replay prevention.

Figure 4:
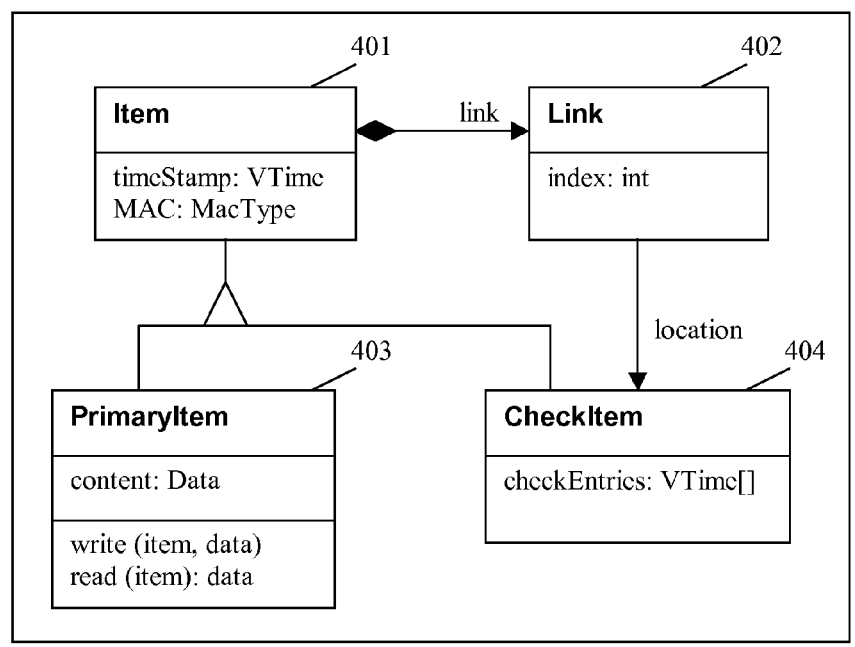
FIG. 4 illustrates the data structures for items and links as class diagrams in the Unified Modeling Language (UML).

FIG. 4 shows the definition of items and links as a class diagram in the Unified Modeling Language (UML). The Item class 401 is the common super class of the PrimaryItem class 403, and the CheckItem class 404. Item class 401 defines a timestamp, a MAC, and aggregates a value of the Link class 402. All of these fields are inherited by primary and check item objects. The type "MacType" is a type suitable to hold a MAC. The type "VTime" of the timestamp is an integral type large enough to express a sufficiently large number of points in virtual time, e.g. >32 Bit. VTime values are incremented during write operations and must not overflow during the lifetime of the system. While objects of the PrimaryItem class 403 have a content field of some arbitrary type, objects of the CheckItem class 404 hold check entries. A check entry array is an array of VTime values. A single check entry is one value in this array. A single check entry records the last modification time of the item that references this entry. Note that a CheckItem 404 holds several timestamps: at least two timestamps are stored in the check entry array, and an additional timestamp is inherited from the Item super class. A timestamp in a check entry records the last modification time of the item which links to it, whereas the inherited timestamp records the last modification time of the check item itself. Link 402 contains two values: a reference to a CheckItem 404, expressed by the location association, and an integer value called idx, which is used to select a check entry in the check item.

A location is a value that uniquely identifies an item in the data store 107. The structure of this value depends on the granularity of an item, such as whether the item is a database row, database field, or a record in a file. For example, to refer to a database row, the location value could be the name of the database table together with a key value that uniquely selects a row in this table. As another example, if items are records in an indexed file, then a location value would consist of the filename and the index of the record in the file.

The PrimaryItem class 403 provides two operations, read and write, that implement the method for detection of and protection against replay attacks. The write operation saves application data 102 to a primary item 110 in the data store 107 and also maintains the additional control information in the check tree 140. The read operation reads application data 102 from a primary item 110 in the data store 107 and also validates the control information in the check tree 140 to detect a replay attack. Details about these operations are given in FIGS. 5 and 6.

Figure 5:
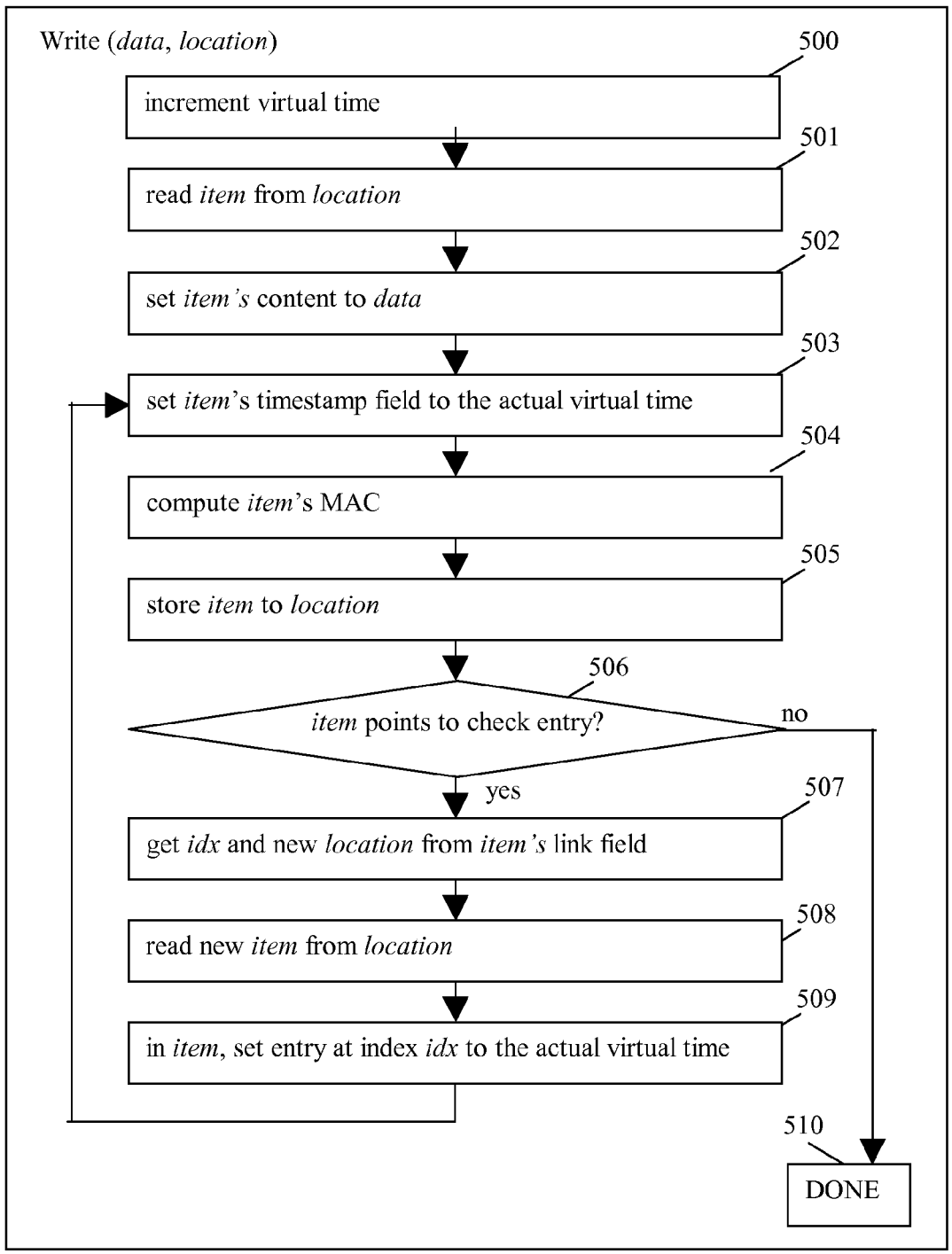
FIG. 5 illustrates the detailed flow for writing a primary item to the data store and for updating the control information in the check tree.

FIG. 5 shows the logic flow for writing application data 102 to a primary item 110 in the data store 107, and for maintaining the control information in the check tree 140. The operation has two parameters: the application data 102 to be stored, and the location where it should be stored. The location has to refer to a primary item 110. It must not refer to a check item 109.

In step 500 the Global Timer 104 is incremented to provide a new VTime value for this write operation. Step 501 reads the item that is currently stored in the data store 107 at the given location. The actual content of the item is not considered at this point, but rather its link information, which is required later in steps 506 and 507. The current content is overridden with the new application data 102 in step 502. In step 503 the item's timestamp is set to the actual virtual time. The item is written back to the data store 107 in step 505 after the MAC for the item is computed and set in step 504. Step 506 determines whether the link field of the item points to a check entry. If it does not point to a check entry, the item is the root 108 of the check tree 140 and the write operation is completed in step 510.

If the link field points to a check entry, processing continues in step 507. In step 507 the location of the item and the index idx of the check entry within this item are fetched from the link field of the actual item. In step 508 the check item is read from its location in the data store. Step 509 updates the timestamp at index idx in the check entry array of the just read check item with the actual virtual time. Processing then loops back to step 503 to protect and store the check item 109 and to continue with additional check entries up to the root 108 of the check tree 140 (which will eventually be detected in step 506).

Figure 6:
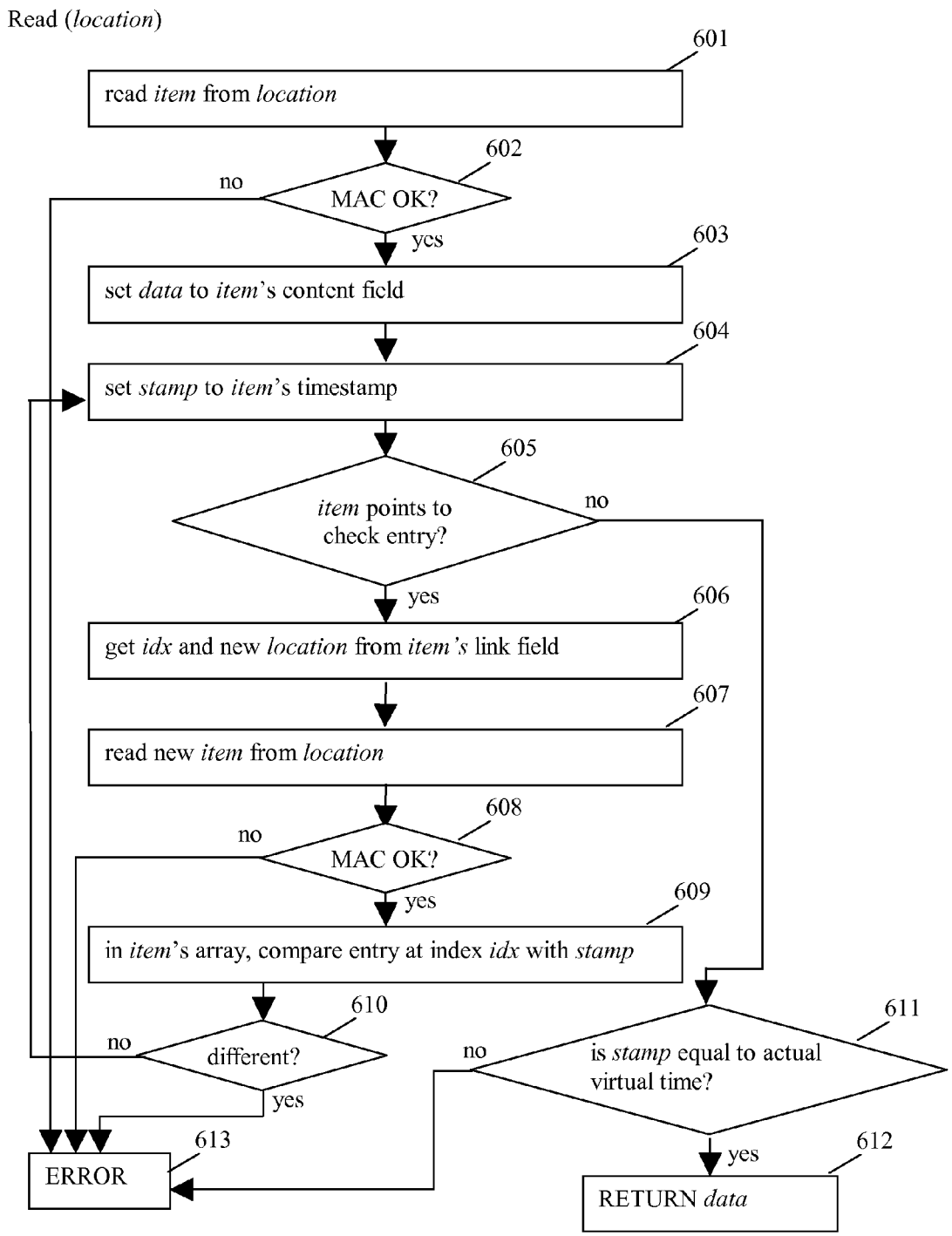
FIG. 6 illustrates the detailed flow for reading a primary item from the data store and for checking the control information in the check tree.

FIG. 6 shows the flow for reading application data 102 from a location in the data store 107, and for checking the control information in the check tree 140. The parameter for the read operation is the location of a primary item 110. The operation will return the application data 102 stored in the item in the data store 107.

In step 601 the primary item 110 is read from the given location in the data store 107. The primary item's MAC is checked in step 602. If this check fails, processing ends in step 613 and an error is reported to the calling application 101. If the MAC is correct, step 603 assigns the content field of the just read item to a variable data, so that it can later be returned to the calling application 101 in step 612. Step 604 saves the item's timestamp in a variable stamp for later comparison. Step 605 then determines whether the link field of the actual item points to a check entry. If it does not point to a check entry, the actual item is the root 108 of the check tree 140 and processing continues with step 611. If the link of the actual item points to a check entry, processing continues to step 606 where the location of the check item 109 and the index idx of the check entry within this check item 109 are fetched from the link field of the actual item. This check item 109 is read from its location in the data store 107 in step 607. Step 608 checks the MAC of the just read check item. If the MAC is not correct, processing ends in step 613. If the MAC is correct, processing continues to step 609.

Steps 609 and 610 compare the timestamp at index idx in the check entry array of the just read check item with the value of stamp (which was set to the virtual time obtained from the former item in step 604). If these values are different, processing ends in step 613. If the values are the same, processing loops back to step 604 to check additional check entries up to the root 108 of the check tree 140 (which will eventually be detected in step 605). When processing reaches step 611 the check tree 140 has been successfully checked up to the root.

Step 611 now compares the stamp variable, which now holds the timestamp of the root item, with the actual virtual time, i.e. the value of the Global Counter 104. If both values are the same, no replays have been detected and the read operation terminates successfully in step 612 by returning the value of data, which was set in step 603. Note that only the value of data (the content only) is transmitted to the calling application. If the two values differ, processing ends in step 613, with an error reported to the caller.

Step 613 is reached only if a replay attack or a data modification is detected, i.e., if a comparison of timestamps failed in step 610 or 611; or if validation of a MAC failed in step 602 or 608. If step 613 is reached, the read operation terminates and signals the error to the caller in order to alert the caller to a possible contamination of the data. Any subsequent operation which depends on the read value is now unsafe with a high probability of producing invalid results. The caller has several courses of action in dealing with this error. Three possible choices are:

a) retry the read operation in the expectation that the modification was only temporary. This would be possible if an attacker didn't permanently modify the data store 107, but intercepted and altered the communication between the data store and the secure environment 150;

b) if the system has a backup of the item, and a complete log of the transactions that were executed in the meantime, and if this information can be read successfully without encountering further replay attacks, the system can restore the account and the caller can try the read again; or c) the caller can precipitate a processing failure, thus forcing a rollback of the actual transaction, and signal the event to an operator.

Figure 7:
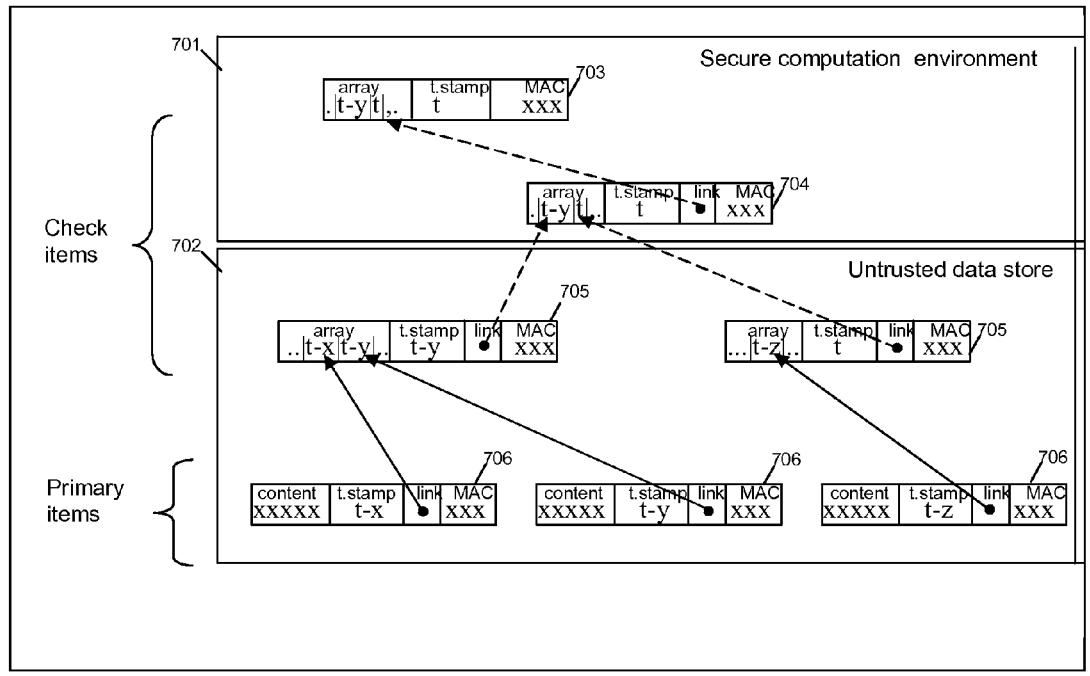
FIG. 7 illustrates an alternative to FIG. 1 for keeping some items within the secure computation environment.
Figure 8:
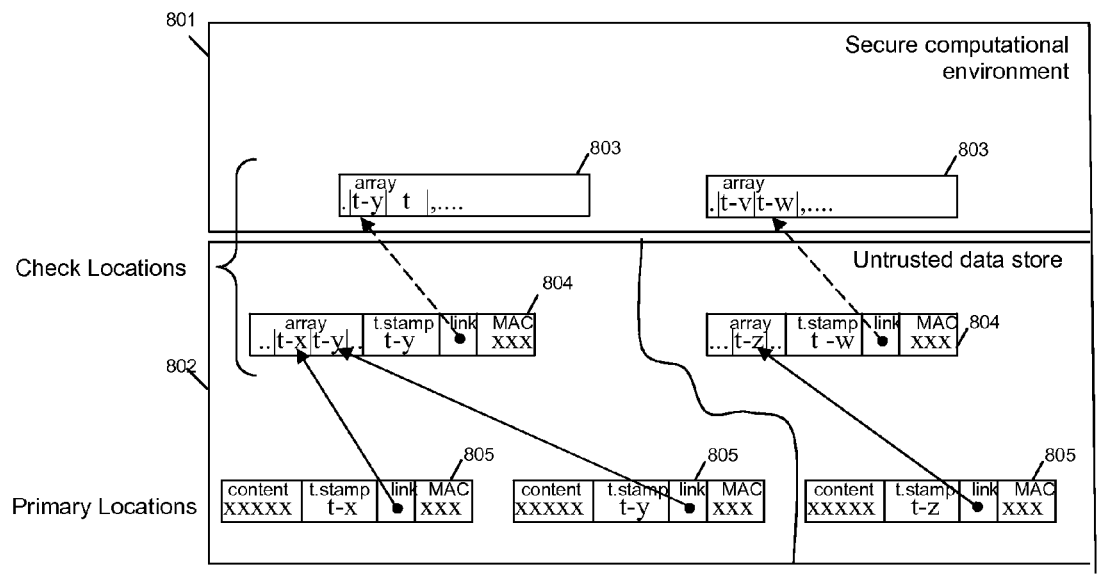
FIG. 8 illustrates an alternative to FIG. 7 with omitted check entries inside the secure computation environment.

FIG. 7 and FIG. 8 show alternative embodiments to the data layout in FIG. 2.

FIG. 7 shows the secure environment 701 but it omits the components that had been shown in FIG. 1 inside the secure environment 150. It also shows a non-secure data store 702 with primary items 706. The important distinction between this data store 702 and the data store 107 of FIG. 1 is that only some of the check items 705 are placed in the data store 702. The root 703 of the check tree, and maybe several layers of check items 704, which are close to the root 703, are placed inside the secure environment. FIG. 7 shows a subset of a check tree as an example: dashed arrows stand for arbitrary layers of check items.

This embodiment is functionally equivalent to the one shown in FIG. 1, but it reduces the height of the part of the check tree that is kept in the data store 702. A disadvantage is that the check items 703-704 inside the secure computational environment 701 may consume precious memory resources of the secure environment 701. The advantage is that for the flows shown in FIG. 5 and FIG. 6 the number of items that have to be read from and written to the data store 702 can be reduced, which in turn can significantly speed up the process. A decision on which embodiment to employ has to consider this trade-off between speed and memory allocation.

FIG. 8 illustrates another embodiment of the invention which is essentially a modification of FIG. 7. In comparison to FIG. 7, the check items 803 inside the secure environment 801 do not have links to check entries. Links are required for check items 804 and primary items 805 in the data store 802, but they are not necessary for items inside the secure environment 801. The root of the check tree and other check items can be omitted, as long as there are no direct links that reach them from items 804-805 in the data store 802. If these check items are omitted, the flows in FIG. 5 and FIG. 6 have to be changed accordingly: check items 803 are not read from or written to disk, and step 611 is omitted and replaced by step 612. For check items 803 inside the secure environment 801 it is also possible to omit the timestamp and MAC fields. FIG. 8 shows a subset of a check tree as an example: dashed arrows stand for arbitrary layers of check items.

FIG. 8 can also be viewed as a forest of check trees with several roots, and therefore also shows how the method for protection against replay attacks can be used to protect different parts of a data store 801 or even different data stores with their own check trees, as indicated by the curved line in FIG. 8.

FIG. 9 shows recursive equations that can be used to compute links to check entries on demand from the address of a primary item x. If links to check entries are computed on demand, it is not necessary to store the links explicitly in the items. Computation of links on demand is simple if the number N of primary entries, and the number n of check entries per check item, are fixed. Here $<c_1, s_1> = <c_x, s_x>$ is the check entry for the primary item x, $<c_2, s_2>$ is the check entry for the check item $c_1$, $<c_3, s_3>$ is the check entry for the check item $c_2$, and so on up to the root of the check tree, $c_r$, where r is the first index for which $l_r=1$ holds, where l is the length function as defined in FIG. 9.

Figure 10:
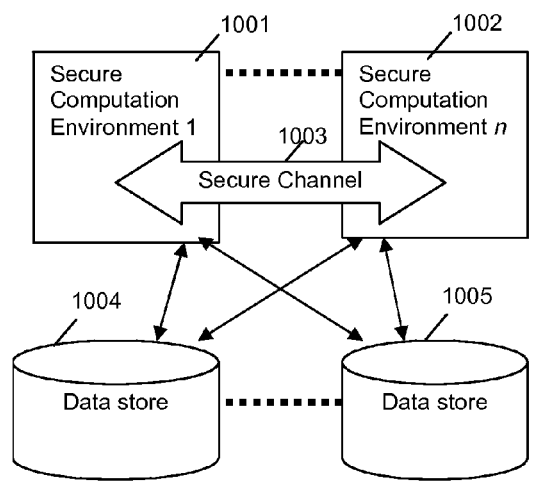
FIG. 10 illustrates the shared use of a single data store or multiple data stores from multiple secure computation environments.

FIG. 10 illustrates another embodiment of the invention in which two or more secure environments 1001-1002 are afforded protection from replay attacks while accessing one or more data stores. In this example two data stores, 1004 and 1005, are shown. In this embodiment 1000 the secure environments 1001 and 1002 establish a secure channel 1003 between them. This channel 1003, or communication link, can be secured by any one of a number of standard cryptographic protocols, such as SSL/TLS (Secure Sockets Layer/Transport Layer Security), which protects against modifications and replay attacks in the communication between two or more secure environments. The secure channel 1003 can then be used to administer and synchronize the sharing of the one or more global timers among all secure environments. This embodiment requires one timer for each data store.

Figure 11:
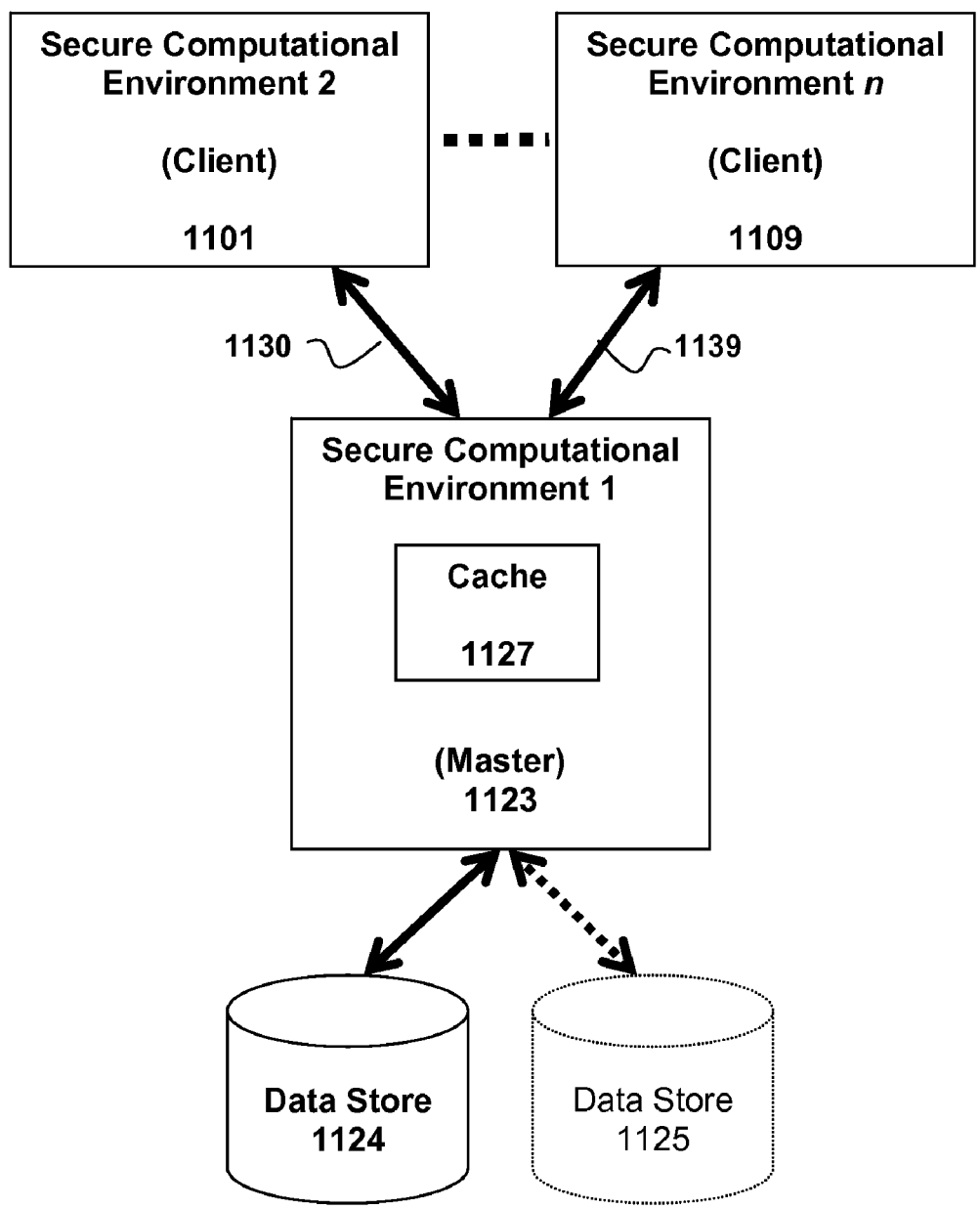
FIG. 11 illustrates an example of a system whereby multiple secure environments access at least one data store through one secure environment, designated as a master.

FIG. 11 shows an alternative embodiment to the one shown in FIG. 10 wherein one secure environment 1123 is designated as the "Master" and a plurality of other secure environments (outside of the Master's secure environment) can access the application data 102 in a data store 1104 through the Master 1123. Only the Master 1123 has access to the items in the data store 1104. The other secure environments 1101 through 1109 act as Clients of the Master 1123, tracking the server/client paradigm. The clients 1101 through 1109 delegate read/write requests to the Master 1123. The Master 1123 implements a service for the Clients. This service provides the read and write operations for the Clients. The service can be accessed through a number of different protocols, such as the TCP/IP (Transmission Control Protocol/Internet Protocol) and RPC (Remote Procedure Calls). RPC is a programming interface that allows one program to use the services of another program in a remote machine. The communication between the Master 1123 and Clients 1101-1109 is represented as the arrows 1130 and 1139. The communication layer must be protected against modifications and replays. This can be done with standard cryptographic techniques such as the SSL/TLS protocol of FIG. 10.

In the example shown in FIG. 11 the Master 1123 provides a cache 1127 which caches read accesses made by all of the Clients 1101-1109. The cache 1127 is logically located inside the Master's secure environment 1123 and is therefore protected against possible attacks. When a Client 1101-1109 requests application data from a data store the Master 1123 first queries the cache 1127 since the requested data might have been cached there from a previous successful request. If the data is available in the cache 1127 the Master 1123 can return that data to the requesting Client without having to access the Data Store 1124. Retrieving cached data is a known method for increasing the speed of data retrievals. In addition, since all modifications to the Data Store 1124 must be channeled through the Master 1123, and no other system can access the Data Store 1124 directly, the cached data is always known to be fresh and not contaminated. It should be understood that the embodiment just described could also be advantageously used without the Cache 1127. Additionally, multiple data stores could be accessed in this manner, in keeping with the spirit and scope of the invention. Data Store 1125 is shown with dashed lines to represent an alternative configuration with multiple data stores.

Referring to FIG. 12 there is shown is a simplified block diagram of a programmable computer that can be configured to operate according to an embodiment of the invention. According to an embodiment of the invention, a non-transitory computer readable medium, such as a CDROM 1201 can include program instructions for operating the programmable computer 1200 according to the invention. The processing apparatus of the programmable computer 1200 comprises: random access memory 1202, read-only memory 1204, a processor 1206 and input/output controller 1208. These are linked by a CPU bus 1207. Additionally, there is an input/output bus 1209, and input/output interface 1210, a disk drive controller 1212, a mass storage device 1220, a mass storage interface 1214, and a removable CDROM drive 1216. What has been shown and discussed is a highly-simplified depiction of a programmable computer apparatus. Those skilled in the art will appreciate that other low-level components and connections are required in any practical application of a computer apparatus.

It is to be understood that the provided illustrative examples are by no means exhaustive of the many possible uses for the invention. Therefore, while there have been described what are presently considered to be preferred embodiments, it will be understood by those skilled in the art that other modifications can be made within the spirit and scope of the invention.

The invention claimed is:

1. A method performed within a secure computational environment for reading application data from a data store, the method comprising steps for:
   receiving a read instruction comprising application data to be read;
   determining a location within the data store for the application data to be read, wherein the data store comprises a check tree represented as a hierarchical tree structure for storing primary items comprising:
      the application data and control information comprising a timestamp, a link to a check entry and a message authentication code; and check items comprising an array of at least two check entries, a check item timestamp, a link to a check entry, and a message authentication code;
   wherein the check item timestamp denotes a point in virtual time provided by a global counter when said check item was last written;
   reading the primary item from the location in the data store;
   validating a message authentication code for the primary item contained at the location;
   parsing the primary item to strip the control information comprising: a timestamp, a link to a check entry, and a message authentication code from the primary item to return only the application data to a calling application;
   iteratively performing elements a, b, and c for each check item associated with the primary item until reaching a root of the check tree by following the links to the check entries along a path from the primary item to the root:
      a) storing the timestamp in a timestamp variable for later comparison;
      b) authenticating the message authentication code for each check item associated with the primary item;
      c) comparing the check item timestamp with the value of the timestamp variable;
   comparing the timestamp variable which now holds the timestamp of the root item, with a value of a global counter logically located within the secure computational environment;
   and
   transmitting only the application data to the calling application if the timestamp comparison is successful.

2. The method of claim 1 wherein the authenticating step further comprises: using a message authentication code key logically located within the secure computational environment to authenticate the message authentication code for each check item along the path from the primary item to the root.

3. The method of claim 1 wherein the authenticating step further comprises:
   comparing the timestamp of the primary item and each check item on the path with the timestamp recorded in a linked check entry if the item is not the root; and
   comparing the timestamp with the actual value of a timer logically located within the secure computational environment if the item is the root.

4. The method of claim 1, further comprising caching application data retrieved from the data store in a cache logically located within the secure computational environment.

5. The method of claim 1, further comprising returning an error code to the calling application if at least one of the following conditions is satisfied: a message authentication code is found to be invalid, and a timestamp comparison fails.

6. A system comprising:
   a data store logically located outside of a secure computational environment, said data store comprising a check tree represented as a hierarchical tree structure for storing primary items comprising:
      application data and control information comprising a timestamp, a link to a check entry and a message authentication code; and check items comprising an array of at least two check entries, a check item timestamp, a unique link to a check entry inside the check item, and a message authentication code;
      wherein the check item timestamp denotes a point in virtual time provided by a timer when said check item was last written;
   the timer logically located within the secure computational environment; the timer configured to be incremented responsive to each write access to the data store;
   the calling application for reading the application data from the data store;
   an encoder/decoder for receiving a read request from the calling application, said encoder/decoder comprising logic for:
      reading the requested primary item and all check items that are on the path from the requested primary item, up to and including a root of the check tree; and
      iteratively performing elements a, b, and c for each check item associated with the primary item that is read until reaching a root of the check tree by following the links to the check entries along a path from the primary item to the root:
- a) storing the timestamp in a timestamp variable for later comparison;
- b) authenticating the message authentication code for each check item associated with the primary item;
- c) comparing the check item timestamp with the value of the timestamp variable;

comparing the timestamp variable which now holds the timestamp of the root item, with a value of the timer logically located within the secure computational environment;

a parser for parsing the primary item to strip the control information comprising: a timestamp, a link to a check entry, and a message authentication code from the primary item to return only the application data to a calling application, responsive to a determination by the encoder/decoder that all timestamp comparisons match, and that all message authentication codes are correct;

wherein the encoder/decoder returns only the application data to the calling application if the timestamp comparison is successful.

7. The system of claim 6, wherein the step of iteratively performing a, b, and c further comprises:

comparing the timestamp with an actual value of the timer if the check item is the root.

8. The system of claim 6, further comprising a cache for caching the application data retrieved from the data store.

9. The system of claim 6 wherein the encoder/decoder comprises logic further configured for storing application data in primary items and for storing control information in check items.

10. The system of claim 6 wherein the encoder/decoder comprises logic further configured for allocating and assigning a new check entry whenever it writes an item.

11. The system of claim 10 wherein the encoder/decoder further comprises logic configured for allocating and assigning the check entry for an item during the first write operation to that item.

12. The system of claim 10 wherein the encoder/decoder further comprises logic configured for consecutively writing to the same item and then reusing the link stored in that item.

13. The system of claim 6 wherein when a primary item is updated, all of the check items along the path from the primary item to the root are updated.

14. The system of claim 6 further comprising an encryption engine for encrypting at least some of the data that is stored in the primary items and the check items.

15. A non-transitory computer readable storage medium comprising computer readable program instructions for:

receiving a read instruction comprising application data to be read from a data store logically located outside of a secure computational environment;

determining a location within the data store for the application data to be read, wherein the data store comprises a check tree represented as a hierarchical tree structure for storing primary items comprising:

the application data and control information comprising a timestamp, a link to a check entry and a message authentication code; and check items comprising an array of at least two check entries, a check item timestamp, a link to a check entry, and a message authentication code;

wherein the check item timestamp denotes a point in virtual time provided by a global counter when said check item was last written, wherein said global counter is logically located within the secure computational environment;

reading the primary item from the location in the data store;

validating a message authentication code for the primary item contained at the location;

parsing the primary item to strip the control information comprising: a timestamp, a link to a check entry, and a message authentication code from the primary item to return only the application data to a calling application;

iteratively performing elements a, b, and c for each check item associated with the primary item until reaching a root of the check tree by following the links to check entries along a path from the primary item to the root:
- a) storing the timestamp in a timestamp variable for later comparison;
- b) authenticating the message authentication code for each check item associated with the primary item;
- c) comparing the check item timestamp with the value of the timestamp variable;

comparing the timestamp variable which now holds the timestamp of the root item, with a value of a global counter logically located within the secure computational environment;

and transmitting only the application data to the calling application if the timestamp comparison is successful.

* * * * *